(12) United States Patent
Hodgson et al.

(10) Patent No.: US 6,834,271 B1
(45) Date of Patent: Dec. 21, 2004

(54) APPARATUS FOR AND METHOD OF SECURE ATM DEBIT CARD AND CREDIT CARD PAYMENT TRANSACTIONS VIA THE INTERNET

(75) Inventors: Robert B. Hodgson, Dunwoody, GA (US); Harry Hargens, Hamton, GA (US)

(73) Assignee: Kryptosima, Hampton, GA (US)

( * ) Notice: Subject to any disclaimer, the term of this patent is extended or adjusted under 35 U.S.C. 154(b) by 0 days.

(21) Appl. No.: 09/450,996

(22) Filed: Nov. 29, 1999

Related U.S. Application Data

(60) Provisional application No. 60/155,645, filed on Sep. 24, 1999.

(51) Int. Cl.[7] .............................................. G06F 17/60
(52) U.S. Cl. ............................ 705/72; 705/64; 705/70; 705/71; 705/75
(58) Field of Search ............................. 705/72, 26, 27, 705/64–79

(56) References Cited

U.S. PATENT DOCUMENTS

| | | | |
|---|---|---|---|
| 5,336,870 A | | 8/1994 | Hughes et al. |
| 5,799,285 A | * | 8/1998 | Klingman .................... 705/26 |
| 5,809,143 A | * | 9/1998 | Hughes ....................... 380/24 |

(List continued on next page.)

FOREIGN PATENT DOCUMENTS

| | | | | |
|---|---|---|---|---|
| GB | 2333878 A | | 4/1999 | |
| GB | 2333878 | * | 4/1999 | ............. G07F/7/10 |

OTHER PUBLICATIONS www.webopedia.com/TERM/d/decryption.html.*
Webopedia.com "dynamic HTML", p. 1.*
Si et al., "Maintaining Page Coherence for Dynamic HTML Page", 1998, ACM.*

*Primary Examiner*—James P. Trammell
*Assistant Examiner*—Jalatee Worjloh
(74) *Attorney, Agent, or Firm*—Lowe Hauptman Gilman & Berner, LLP

(57) ABSTRACT

The present invention is directed to a combination software and/or hardware system that provides consumers and merchants with a secure method for making and accepting credit card and ATM card payments over the Internet. Using various software and/or hardware implementations, the system operates by:

1) creating (at the consumer's Internet access device) a Data Encryption Standard (DES) encrypted Personal Identification Number (PIN) Block meeting American National Standards Institute (ANSI) X9.8 and Automatic Teller Machine (ATM) network requirements (as a result of the consumer entering their PIN number and encryption automatically taking place);

2) using additional layer(s) of encryption (also performed at the consumer's Internet access device) to place the PIN block and card information in a public key/private key encrypted financial payment transaction data block ("FP Block");

3) transmitting the FP Block to the merchant, along with any necessary product or service order information, which may be transmitted over the Internet encrypted or in the clear according to the implementation method chosen by the system software at the merchant's web site;

4) software at the merchant location then forwards the FP Block to a secure transaction management system, where the FP Block is decrypted using a decryption algorithm matching that used by the software at the consumer's Internet access device. The financial data is then re-formatted for transmission to the appropriate transaction processing network, and forwarded to the payment service processor accordingly. The present invention is independent of the encryption algorithm(s) used, and may be implemented with any number of encryption algorithms.

29 Claims, 18 Drawing Sheets

U.S. PATENT DOCUMENTS

| | | | |
|---|---|---|---|
| 5,870,724 A | | 2/1999 | Lawlor et al. |
| 6,088,683 A | * | 7/2000 | Jalili .......................... 705/26 |
| 6,092,053 A | * | 7/2000 | Boesch et al. ................ 705/26 |
| 6,098,053 A | | 8/2000 | Slater |
| 6,286,099 B1 | * | 9/2001 | Kramer ...................... 713/172 |
| 6,308,887 B1 | * | 10/2001 | Korman et al. ............. 235/379 |
| 2001/0042051 A1 | * | 11/2001 | Barrett et al. ................. 705/65 |
| 2002/0152180 A1 | * | 10/2002 | Turgeon ...................... 705/72 |

* cited by examiner

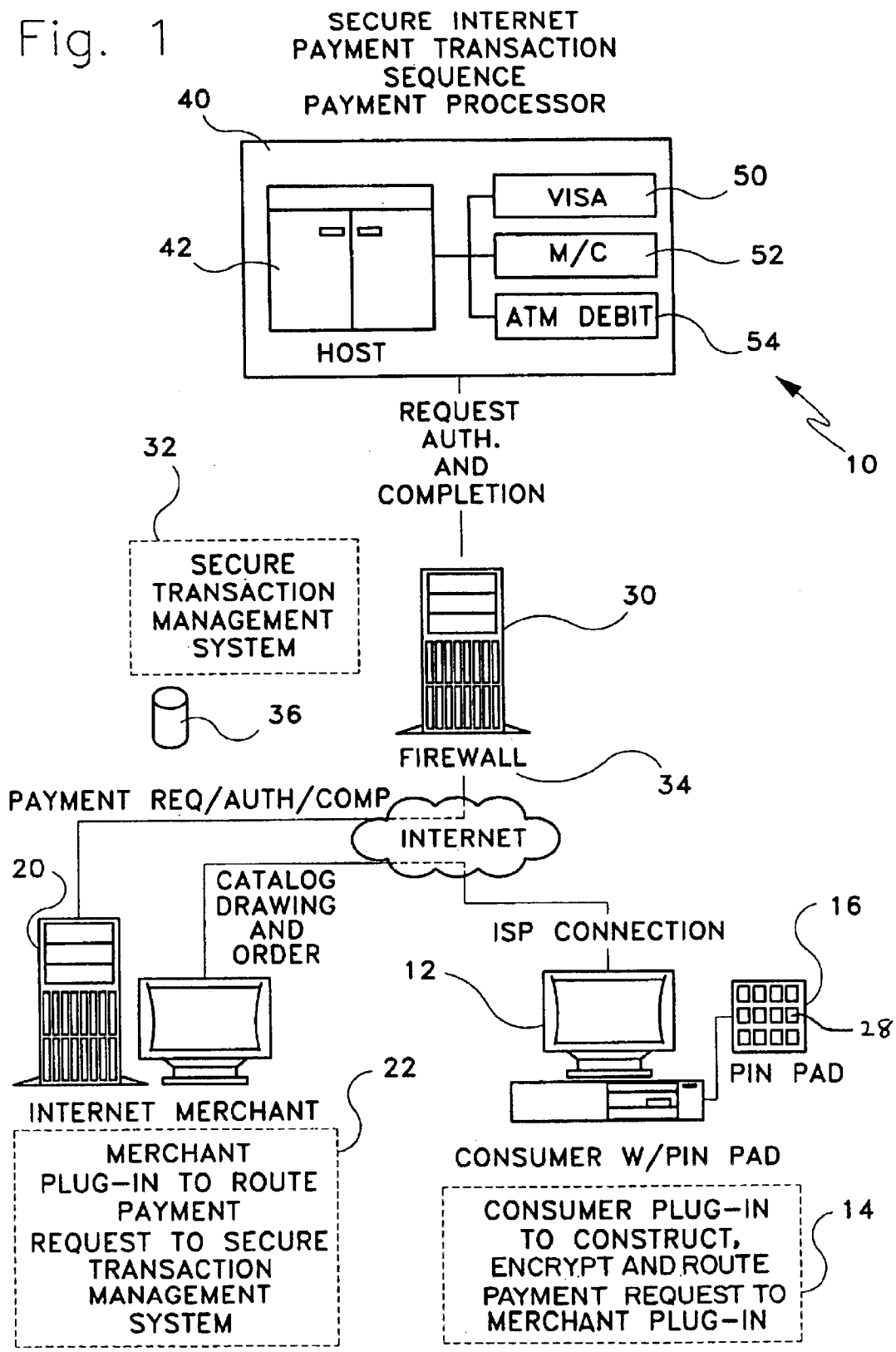

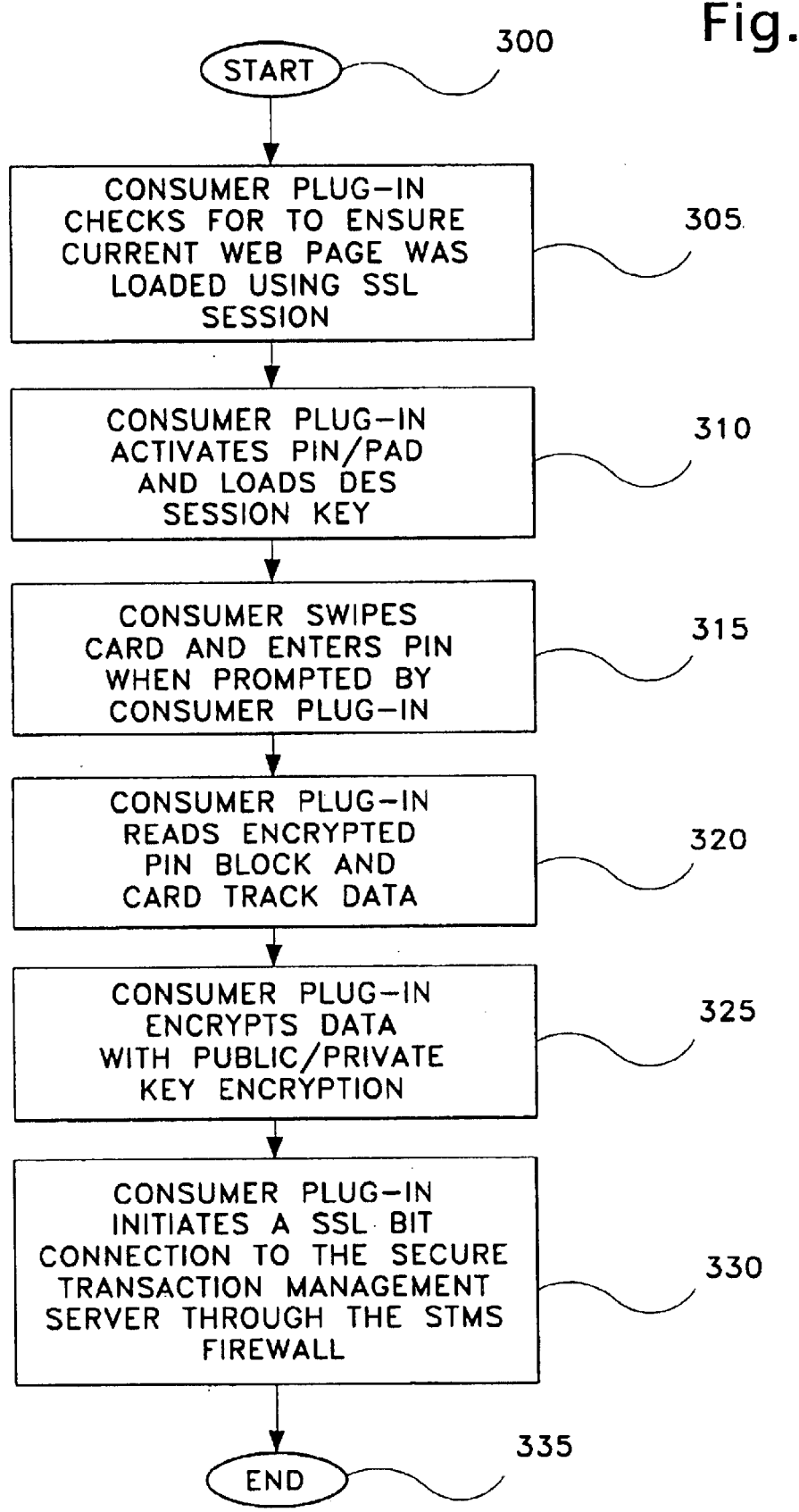

FIG. 6

| Merchant Order Form - page 1 Netscape |
|---|

File  Edit  View  Go  Communicator  Help

Back  Reload  Home  Search  Netscape  Print  Security

Bookmarks  Go to: https://www.merchant.com/MyInformation.org

Instant Message  WebMail  Contact  People  Yellow Pages  Download  Channels

Welcome to the Merchant.com SECURE checkout form.

Step 1 - Login, or first time visit?

Please enter your e-mail address

Please double check your e-mail address for accuracy.
This is how we will communicate with you about your order.

Password for returning customers ONLY.

Step 2 - Payment method.

○ credit card (Visa, MC, Discover)   ⊙ ATM checking account card
(star, interlink, plus)

Step 3 - Delivery address.

Street address

Street 2

City                    State        Zip

Proceed to Authorization —— 610

Document Done

APPARATUS FOR AND METHOD OF SECURE ATM DEBIT CARD AND CREDIT CARD PAYMENT TRANSACTIONS VIA THE INTERNET

RELATED APPLICATION

The present application claims priority of U.S. Provisional Application Ser. No. 60/155,645, filed Sep. 24, 1999, entitled "APPARATUS FOR AND METHOD OF SECURE ATM DEBIT CARD AND CREDIT CARD PAYMENT TRANSACTIONS VIA THE INTERNET", the disclosure of which is incorporated by reference herein in its entirety.

FIELD OF THE INVENTION

The present invention relates generally to the field of secure communications, and more particularly, to the field of secure transactions using the Internet.

BACKGROUND OF THE INVENTION

There is much concern about the security of financial transactions using the Internet. While the Internet is very useful for browsing for information, many are quite hesitant to send their credit card and personal identification number (PIN) via the Internet, because there is a significant risk that the information can be intercepted on the Internet and stolen. One way to avoid the problems of the Internet is not to use it at all, however, this means that the benefits of the Internet cannot be realized.

One proposed solution is described in U.S. Pat. No. 5,809,143 issued on Sep. 15, 1998. Apparatus and methods are disclosed in the '143 patent for transacting secure purchase and bill payment transactions. The method for transacting a secure purchase via an Internet uses a system including a computer, a first communication device coupled to the computer and to the Internet, and a secure keyboard, the secure keyboard including a controller, an interface between the controller and the computer, a removable media interface, an alphanumeric keypad, an encryption device, and a second communication device coupled to a secure host. The method using the disclosed system includes the steps of browsing the Internet via the first communication device, and retrieving item data for a purchase from the Internet via the first communication device, and accessing information from removable media using the removable media interface. The information includes a user identifier and an issuer identifier, and a PIN entered on the alphanumeric keypad. The PIN is encrypted using the encryption device and sent to secure host via the second communication device along with the information, the item data, and the encrypted PIN. The secure host blocks the information and the PIN from access by others on the Internet. The secure host requests authorization from a bank system for making the purchase using the information and PIN and proceeds with the purchase if the secure host receives from the bank system a bank authorization for the purchase. Otherwise the secure host cancels the purchase. The secure host sends purchase transaction data to the secure keyboard via the second communication device. The secure keyboard then prints a purchase transaction receipt.

Disadvantageously, by definition, the "secure keyboard" disclosed in the '143 patent relies on the use of a second phone line to route transaction data securely around the Internet, rather than over the Internet. This approach is appropriate for securing sensitive data in commercial and military applications, however, the burden for a second line (in terms of both the ongoing cost and the initial installation complexity) is onerous and unacceptable to most consumers. Further, the approach of routing the transaction data over a second path, and merging it later back at the merchant's web site, adds an unacceptable level of difficulty to the implementation for merchants.

Another disadvantage is that the "secure keyboard" requires a modem, printer and card reader integrated into a keyboard. This results in a very expensive device, that needlessly, replicates hardware already present in a computer and therefore this is also impractical from a cost/market viewpoint.

SUMMARY OF THE INVENTION

It is, therefore, an object of the invention to conduct secure Internet transactions over the Internet using simplified commercially available hardware off the shelf.

Another object of the present invention is to conduct secure Internet transactions over the Internet using a single phone line.

Yet another object of the present invention is to provide a method and system of software loaded onto a consumer computer, merchant server and a centralized secure transaction-management software.

It is yet a further object of the present invention to encrypt a PIN and credit card or ATM card information using DES and public/private key encryption.

It is yet another object of the present invention to use a PIN/PAD to enter and encrypt a consumer PIN.

The present invention is directed to a combination software and/or hardware system that provides consumers and merchants with a secure method for making and accepting credit card and ATM card payments over the Internet. Using various software and/or hardware implementations, the system operates by:

1) creating (at the consumer's Internet access device) a Data Encryption Standard (DES) encrypted Personal Identification Number (PIN) Block meeting American National Standards Institute (ANSI) X9.8 and Automatic Teller Machine (ATM) network requirements (as a result of the consumer entering their PIN number and encryption automatically taking place);

2) using additional layer(s) of encryption (also performed at the consumer's Internet access device) to place the PIN block and card information in a public key/private key encrypted financial payment transaction data block ("FP Block").

3) transmitting the FP Block to the merchant, along with any necessary product or service order information, which may be transmitted over the Internet encrypted or in the clear according to the implementation method chosen by the system software at the merchant's web site;

4) software at the merchant location then forwards the FP Block to a secure transaction management system, where the FP Block is decrypted using a decryption algorithm matching that used by the software at the consumer's Internet access device. The financial data is then re-formatted for transmission to the appropriate transaction processing network, and forwarded to the payment service processor accordingly. The present invention is independent of the encryption algorithm(s) used, and may be implemented with any number of encryption algorithms.

The encrypted PIN block remains encrypted until reaching the payment processor where existing DES encryption hardware decrypts the PIN block. The present invention also covers systems where the PIN block is decrypted at the secure transaction management server (rather than the payment processor) manage the encryption keys at the consumer's locations. The encryption of the PIN block at the consumer's location is done either by hardware or by software executed by the Internet access device. In the case of hardware, the present invention covers both hardware attached as a peripheral or add-on, and hardware incorporated into the original design and/or manufacture of the device. The transaction is then processed using the existing credit card or ATM POS (Point Of Sale) transaction processing functions.

These and other objects of the present invention are achieved by a method of transacting a secure purchase via the Internet including browsing a merchant web site by a user. An encrypted PIN block is created. An order is built from the merchant web site including purchase information and the encrypted PIN block to form a data block. The data block is further encrypted to form an encrypted payment block. The encrypted payment block is forwarded to a secure host. A decrypted payment block formatted for use by a bank system is routed. The order is proceeded if the secure host receives from the bank system a bank authorization for the purchase, and if no authorization is received, then canceling the purchase. The authorization is forwarded to the merchant web site. An indication is sent of a completion of the purchase to the user.

The foregoing and other objects of the present invention are achieved by a system for transacting a secure purchase via the Internet including a consumer Internet access device having a merchant response software plug-in loaded into a web browser residing thereon for building an order.

A PIN/PAD is operatively connected to said consumer Internet access device for entering a consumer PIN.

A merchant server has a merchant response software residing thereon for recording information about consumer transactions with the merchant server.

A secure transaction management server has a merchant response software residing thereon for forwarding the PIN to a bank system and sending an authorization from the bank system to the merchant server and the consumer Internet access drive.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 is a high level block diagram of the secure Internet payment transaction system according to the present invention;

FIG. 3 is a high flow diagram depicting one of the steps in FIG. 2 in greater detail;

FIG. 6 is a screen shot of a secure web page;

BEST MODE FOR CARRYING OUT THE INVENTION

Figure 2A:
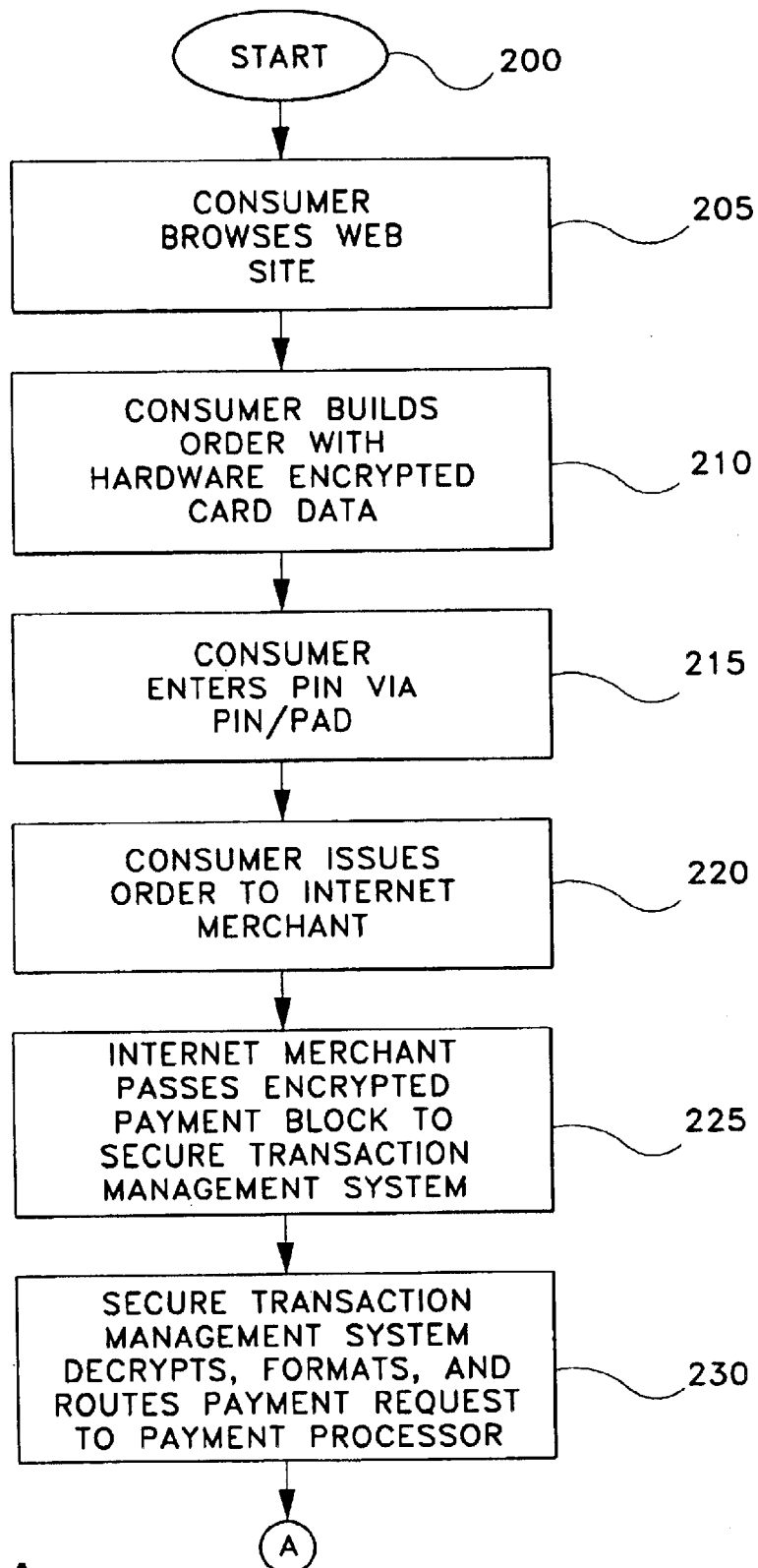
FIGS. 2A and 2B are a high-level flow diagram of the process according to the present invention.
Figure 2B:
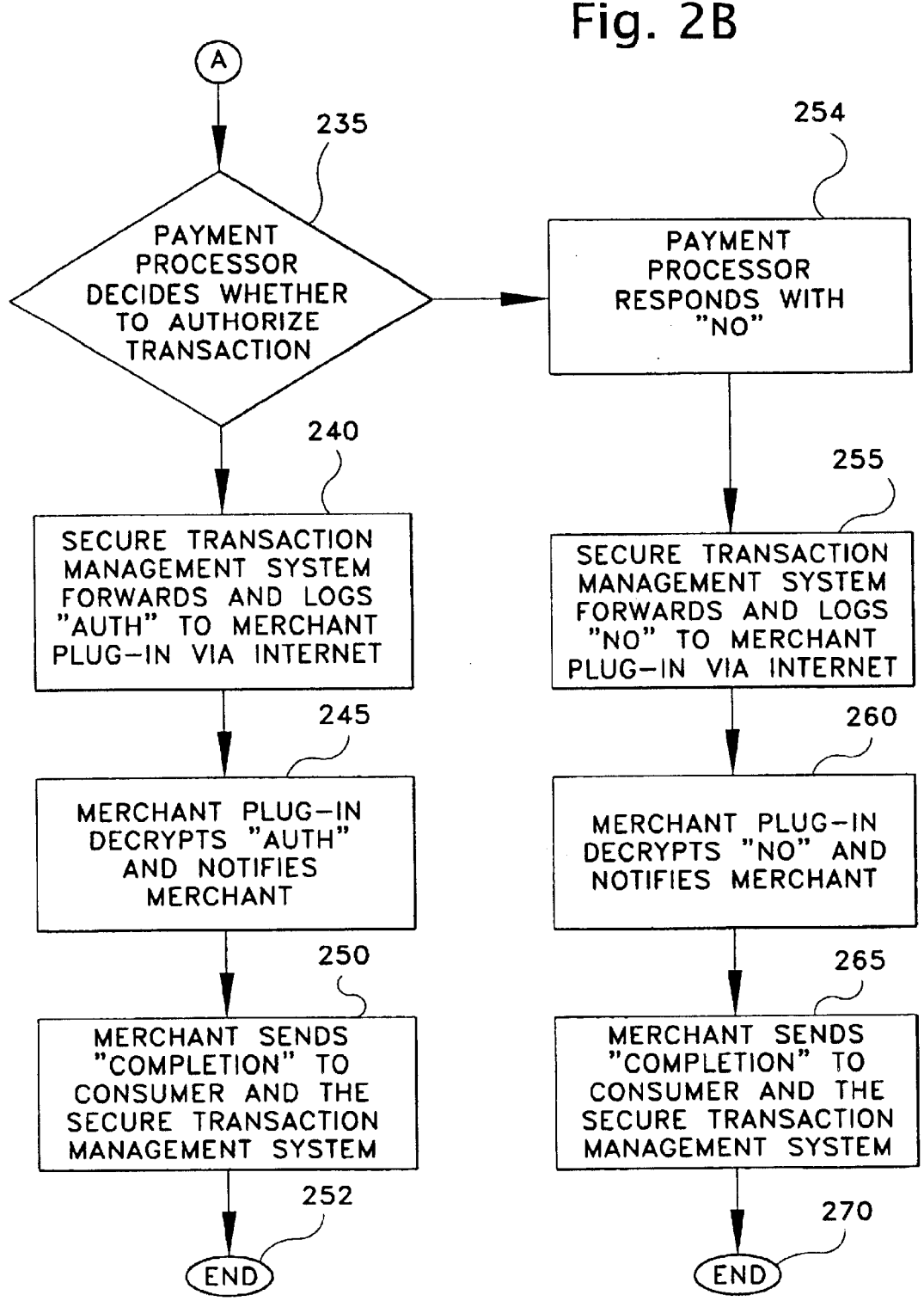

A method and apparatus for secure ATM debit card and credit card payment transactions via the Internet according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

There are various shopping cart systems in use on the Internet and the present invention appears to the consumer to be no different. Regardless of the shopping cart system, when the consumer is ready to purchase the items in the consumer's shopping cart the process for the financial transaction will be the same.

Refer now to FIG. 1 where the physical and logical architecture of the present invention is depicted. The merchant response system 10 includes a consumer personal computer 12 having a consumer merchant response software (cMRS) plug-in 14 that is loaded into the consumer's web browser as a Java applet. Connected to the consumer PC 12 is a PIN pad 16. The PIN/PAD 16 is used to conduct secure financial transaction for credit cards or debit cards. In a typical financial transaction, information is read from a credit or debit card and then the user enters certain information via the PIN/PAD 16 including number keypad 28. An important data entered by the user is the user's PIN number. The PIN is assigned to the user by a financial institution and needs to be kept secure. Today, PINs are in common use with ATM credit cards. Even though a user may be able to select his/her own PIN, the PIN should be known only to the user and the financial institution. Optionally, as part of computer system 1400 or the PIN/PAD 16, a magnetic card reader can be provided.

A Java run-time environment (JVM) by Sun Microsystems is installed on the consumer PC 12 and allows for plug-in access to consumer PC 12 hardware. The JVM is required to activate the PIN/PAD 16 from a web browser plug-in. The JVM also has added security and encryption routines that enable SSL communication from within an applet. The consumer PC 12 is connected to the Internet 18. An Internet merchant includes a server 20 including merchant response software (mMRS) 22 that resides on the merchants' web server 20. The merchants' web server 20 includes web pages for browsing by the consumer 12. The merchant server 20 is connected to the Internet 18.

A secure transaction manager server 30 handles all of the transaction requests (usually purchases or bill payments by a consumer using consumer PC 12) over the Internet 18. A secure transaction management merchant response software (tMRS) 32 resides on the secure transaction manager server 30. A firewall 34 is located between the secure transaction management server 30 and the Internet 18. A secure transaction management server database 36 is connected to the secure transaction management server 30. All purchase transactions are forwarded from the secure transaction management server 30 to a payment processor, generally indicated at 40. The payment processor 40 includes a host 42 which can then route transaction requests to payment processors such as Visa 50, Master Card 52 and bank servicing ATM debit cards 54. The purpose of the secure server 20 and the server 30 is to prevent data that is sent from consumer PC 12 via the modem from being available or sent to the insecure Internet 18. The secure host 30 has an interface to the banking system 40. The secure host 30 sends only data that is necessary and prevents sensitive information such as credit card information and personal identification number (PIN) data from being sent to the merchant 20. The secure host 30 does send the needed credit card/debit card/smart card information to the banking system 40 to request approval for financial transactions.

The present invention is described for one merchant and one consumer for convenience and it is to be understood that any number of merchants and consumers can utilize the present invention.

The present invention uses one software program called merchant response software (MRS) distribute on three computers including the consumer PC 12 where the consumer plug-in (cMRS) 14 resides, the merchant response server 20 where the merchant response software (mMRS) 22 resides, and the secure transaction management server 30 where the secure transaction management merchant response software 32 resides.

A brief overview of the process according to the present invention using the described architecture is illustrated in FIG. 2. At step 205, the consumer using consumer PC 12, browses a web site on the Internet merchant server 20 over the Internet 18. At step 210, the consumer using consumer PC 12 conducts a purchase transaction by selecting one or more items from the merchants' Internet web site. When the consumer finds something that he or she wishes to buy, the item data associated with the item is retrieved from the Internet and downloaded via modem to consumer computer 12. Then the user is prompted via the monitor 12 to enter a card type, such as credit card or debit card. Then in step 215, the user is prompted to swipe the credit or debit card via the PIN/PAD 16. The information as illustrated in FIGS. 2C and 2D, is read from the card.

Figure 2C:
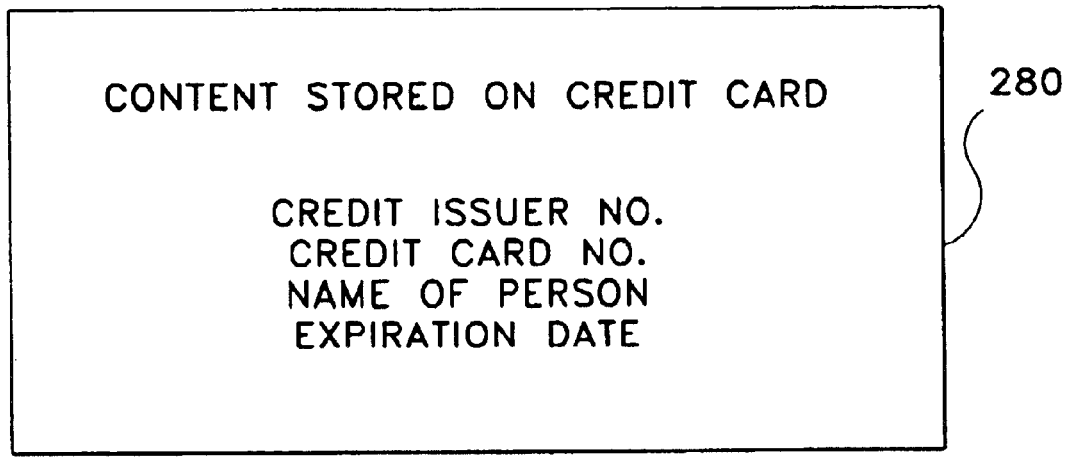
FIGS. 2C and 2D illustrate data stored on a typical credit card and a typical ATM card, respectively.
Figure 2D:
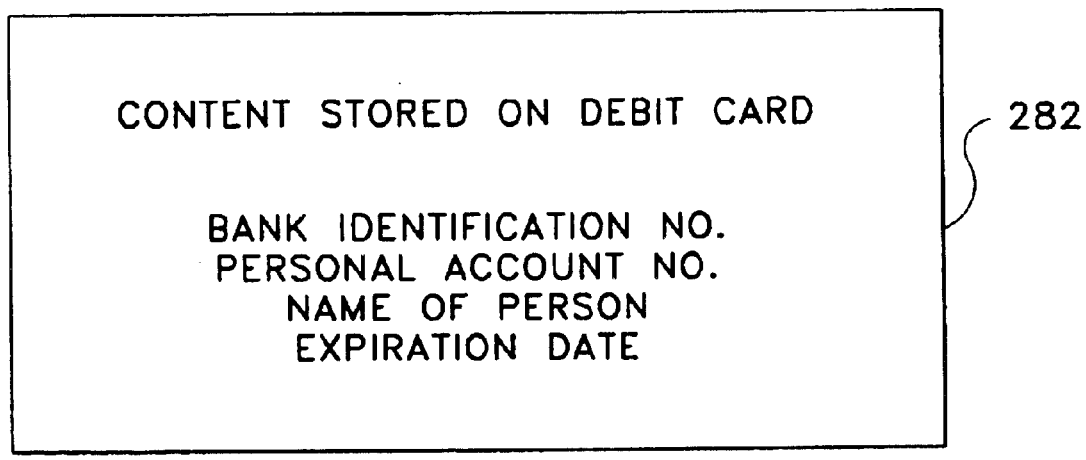

FIG. 2C illustrates the data that is stored on a typical credit card 280 and on a magnetic strip. Typical information includes a credit issuer number, a credit card number, the name of the person and the expiration date. FIG. 2D illustrates the data that is stored on a typical credit card and on a magnetic strip typical information includes a credit issuer number, a credit card number, the name of the person and the expiration date. The credit issuer number can be a bank for example. Note that the PIN is not stored on the cards. This prevents a thief from obtaining the PIN number if the card is stolen. The credit card number is the typical credit card number that is embossed on the front of the credit card.

FIG. 2D shows the contents typically on a debit card such as an ATM card. This information is also stored on a magnetic strip on the back of the card. Typical information includes a bank identification number, a personal account number, the name of the person and an expiration date. This bank identification number is analogous to a credit issuer number or a credit card and identifies the bank that issued the debit card. The personal account number is the same as the account number embossed on the front of the debit card and is not to be confused with the PIN.

The user uses the credit card or a debit card to make the purchase and can enter alternatively the information from the card into the PIN/PAD 16 through pad keys or via a removable media interface which can read a credit card or a debit card. After the credit card or debit card has been read, then the user enters his or her PIN. The PIN entry may not be required for a credit card transaction. The PIN is then encrypted and the credit card information can also be encrypted and then the PIN, the order data and the credit card or debit card information are sent via modem 1418 (see FIG. 14).

At step 220, the consumer issues an order to the Internet merchant server 20. At step 225, the Internet merchant server 20 passes the encrypted payment block to the secure transaction management system 30 via the Internet 18. At step 230, the secure transaction management system 30 decrypts, formats and routes a payment request to the banking system or payment processor 40. At step 235, the secure host 30 sends the card information and the PIN to the banking system 40. The banking system 40 checks to ensure that a proper credit card or debit card and PIN have been received and if the credit card or debit card and associated PIN is correct and the consumer's credit is satisfactory, then the banking system 40 responds back to the secure transaction management server 30 with authorization to proceed with the transaction at step 240. At step 245, the secure server 30 notifies the merchant server 20 that there is purchase being made and the secure server 30 can inform the merchant server 20 what the item is and also identify the user that is buying the item. At step 235, if the banking system 40 decides not to authorize the payment, then at step 254, the payment processor responds with no. At step 255, the secure transaction management system 30 forwards and logs no to the merchant plug-in 22 via the Internet 18. At step 260, the merchant plug 22 decrypts no and notifies the merchant 20. At step 265, the merchant server 20 sends completion to consumer plug-in 14 and the secure transaction management server 30. At step 240, the payment processor responds with "AUTH" and the secure transaction management system 30 forwards and logs "AUTH" to merchant plug-in 22 via the Internet 18. At step 245, the merchant plug-in 22 decrypts "AUTH" and notifies merchant 20. At step 250, the merchant server 20 sends "Completion" to the consumer 12 and the secure transaction management system 30. Since the payment to the merchant account is all done within the banking system from the user's banking account to the merchant's banking account, it is in general not necessary, especially in a debit transaction to send any information about the debit card to the merchant host. However, in a credit card transaction, the merchant may feel more secure in at least knowing the credit card number of the user for the transaction. So in the case of credit cards, the communication between the secure host and the merchant host may include the credit card number. At step 252, the process is complete.

Step 205 is described in greater detail in FIG. 3 where the process is started at step 300. At step 305, the consumer initiates the ATM or the credit card transaction and during step 305, the cMRS 14 first checks to ensure that the current page was loaded using SSL 40 bit encryption. If SSL 40 bit encryption was not used, then the cMRS 14 initiates an SSL session to Merchant Response Software (mMRS) 22 inserting a failure status message into a transaction log in the Secure Transaction Manager Server (STMS) 32. The STMS then informs the consumer using consumer processing center (PC) 12 of the failure status. The cMRS 14 also checks (if possible) whether the consumer has already registered their PIN/PAD 16 with the PC 12. At step 310, the cMRS 14 initiates secure communication with the PIN/PAD 16 and loads Data Encryption Standard (DES) session key. At step 315, the cMRS 14 prompts the consumer for a debit or credit card and the consumer either enters their credit card number or swipes their debit or credit card. The cMRS 14 presents a screen ensuring the consumer that the PIN is being encrypted during step 310. At step 320 the cMRS 14 reads encrypted PIN block and card track II data from PIN/PAD 16 and at step 325, the cMRS 14 then encrypts the DES encrypted information with public key encryption. Public key encryption is a solution to widespread open network security and is a more sophisticated form of code making, first developed by mathematicians at MIT in the 1970s. In this approach, each user creates two unique keys. For example, the customer would have his/her "public key" which is published in a directory. The user has his/her own "private key", which is kept secret.

The two keys work together as a match set. Whatever data one of the keys "locks" only the other can unlock. For example, the consumer wants to send a private transaction. The consumer plug-in cMRS 12 uses the "public key" to encrypt the transaction. When the secure server tMRS 30 receives the transaction, the "private key" converts the encrypted message back to the original message.

Advantageously, even if a would-be criminal intercepts the transaction on its way to the secure server, there is no way of deciphering the transaction because the would be criminal does not have the "private key".

At step 330, the cMRS 14 initiates an SSL 40 bit connection to the tMRS 32, and transmits the triple encrypted data through the STMS firewall 34. The data includes card/pin information, merchant number, tracking number from merchant and dollar amount of the transaction. The cMRS 14 then waits for a specified amount of time for a response. The consumer is informed of the time frame involved in the transaction. At step 335, this portion of the process is complete.

Figure 4A:
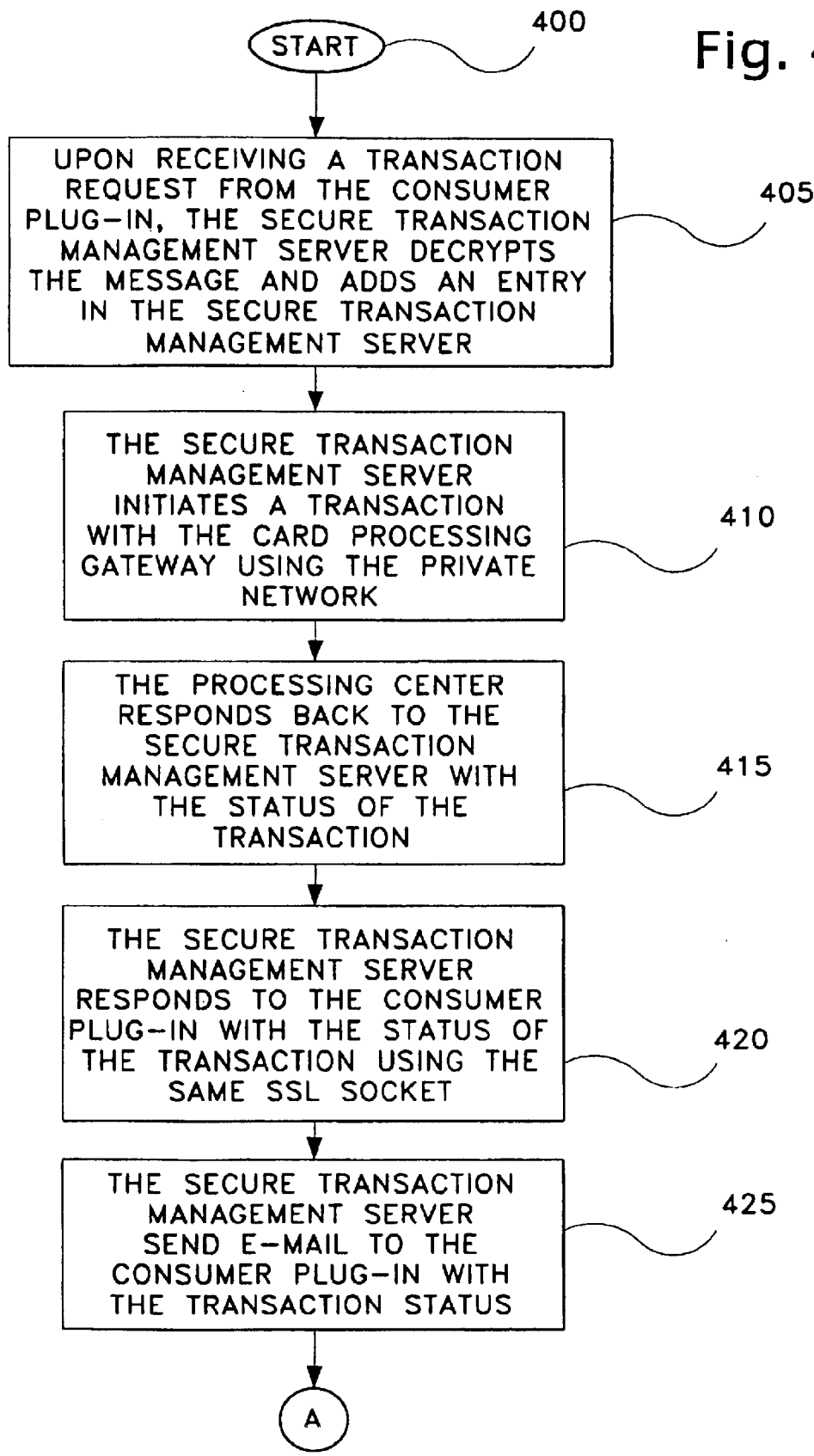
FIGS. 4A–4C are flow diagrams depicting one or more of the steps in FIG. 3 in greater detail.
Figure 4B:
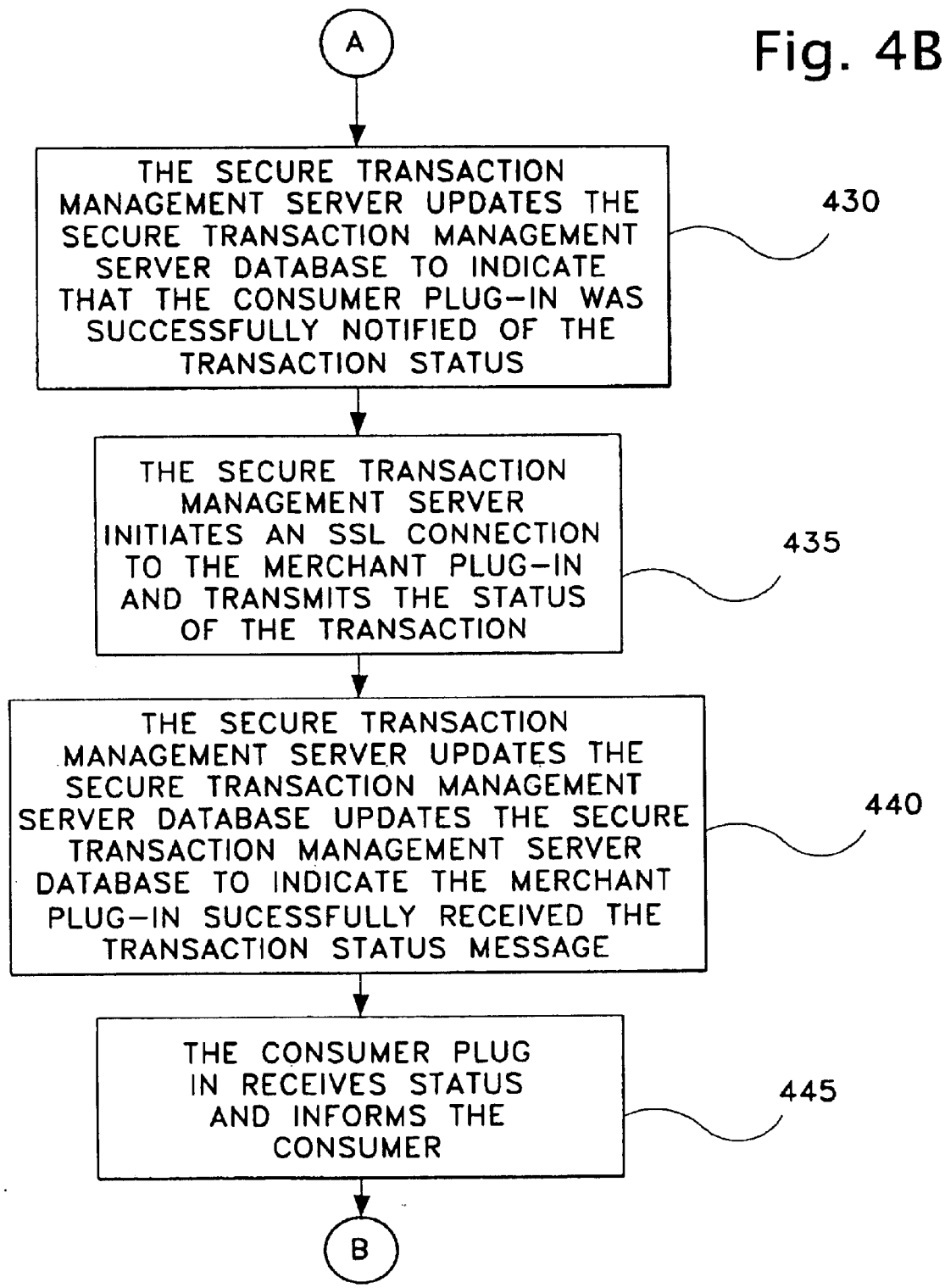
Figure 4C:
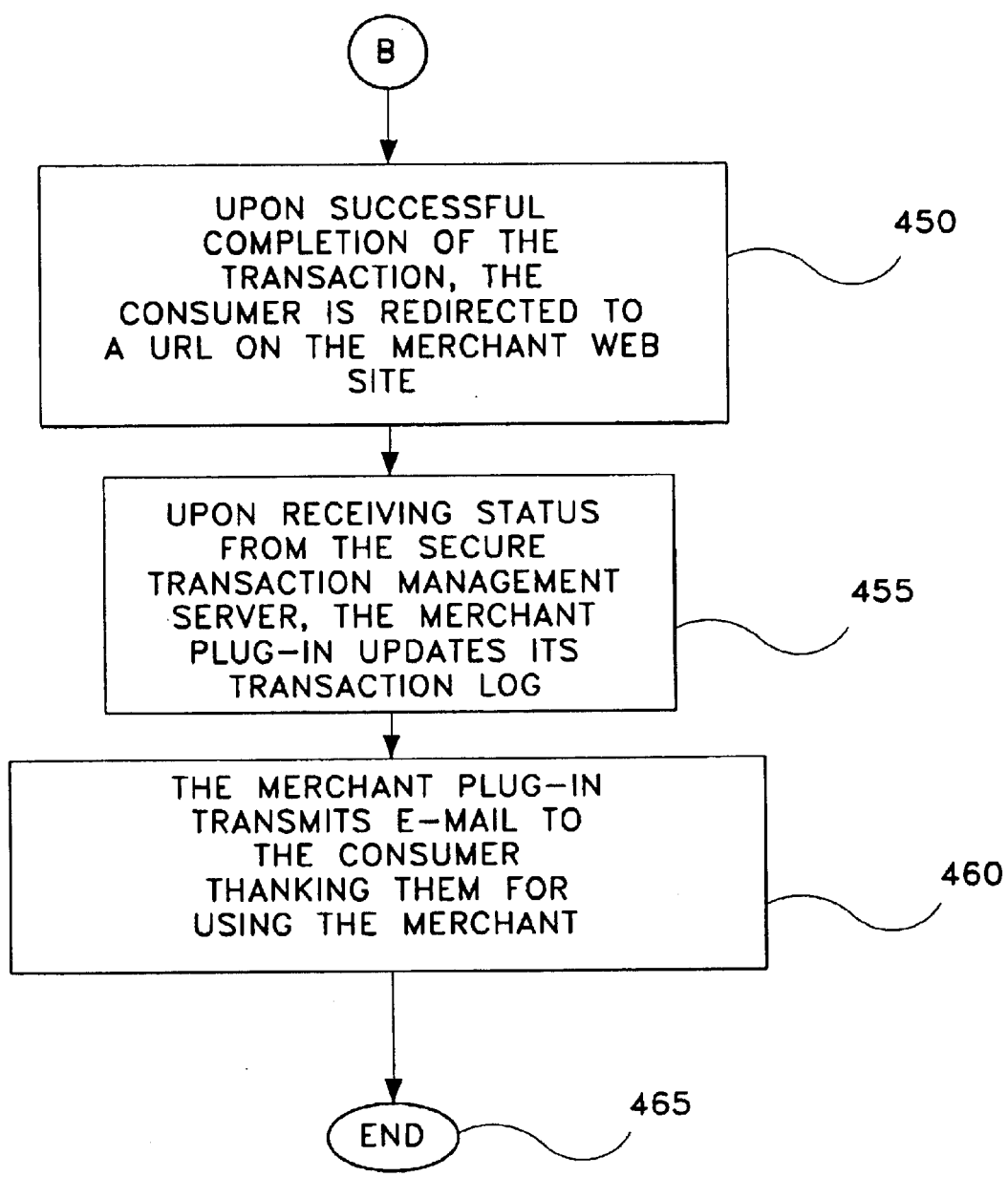

In FIG. 4, the process of the STMS receiving and processing the transaction from the consumer in step 330 is described in greater detail. At step 400, the process is started. At step 405, the tMRS 32 receives the transaction request from the consumer using the cMRS 14. The SSL 40 bit is automatically decrypted by the web server 20. The tMRS 32 decrypts the public key/private key encryption and the tMRS 32 creates an entry in the tMRSdb 36 with the transaction information and sets the transaction status to pending. At step 410, the tMRS 32 initiates a transaction with the card processing center gateway, transmitting the appropriate information. At step 415, the processing center responds back to the tMRS 32 with the status of the transaction. Upon receiving a response from the processing center, the tMRS 32 updates the tMRSdb 36 with the new status of the transaction. At step 420, the tMRS 32 responds to the cMRS 14 with the status of the transaction using the same SSL socket as before. At step 425, the tMRS 32 sends e-mail to the consumer on computer 12 indicating the status of the transaction. At step 430, the tMRS 32 updates the tMRSdb 36 to indicate that the consumer cMRS 14 was successfully notified of the transaction status. At step 435, the tMRS 32 initiates a 40 bit SSL connection to the mMRS 22 on the merchant's web server 20 and transmits the status of the transaction and the action of the mMRS 22 is described in detail below. At step 440, the tMRS 32 updates the tMRSdb 36 to indicate the mMRS 22 has successfully received the status message transmitted. At step 445, upon receiving status at step 425, the cMRS 14 informs the consumer of the status. If the status is not successful, then the consumer will be provided with information on how to proceed. At step 450, upon successful completion of the transaction, the consumer is redirected to a Uniform Resource Locator (URL) on the merchant's web server 20. The URL was provided as a parameter on initial loading of the cMRS 14. At step 455, upon receiving status from the tMRS 32, at step 405, the mMRS 22 updates its transaction log. At step 460, the mMRS 22 transmits e-mail to the consumer, thanking them for using the merchant's services and MRS. The message will also confirm that the transaction was completed and recorded by the merchant. This message can be customized to the merchant's liking. No sensitive information is contained in this message. At step 465, the process is complete.

Consumer Merchant Response Software (cMRS)

The specifications and requirements of the cMRS 14 of the MRS are described below. The cMRS 14 requires browser support. Due to the nature of the cMRS 14 Java based plug-in that will be required, it will be necessary to require that consumers have one of the latest versions of Microsoft Internet Explorer (MSIE) or Netscape Navigator (NN). This requirement is due to the fact that older versions of Java were far too locked down and would not allow a Java applet to write data out to the keyboard device such as PIN/PAD 16. This is a necessity as the keypad that cards are swiped through requires at least an activation command.

In order for the cMRS 14 to successfully make a transaction request, obtain status of an outstanding transaction request, and recover from any failed requests, the following minimum parameters are required: merchant number; merchant/consumer tracking number which is a number assigned by the merchant to track the consumer's order; the total dollar amount of the transaction; consumer's e-mail address so that it can be logged in the tMRS database 36 in case the consumer needs to be notified of a failure or problem not involving the merchant; consumer's first and last name; consumer's phone number; and follow-up URL which is a merchant web page that cMRS 14 can redirect the consumer to upon successful completion of the transaction. These parameters are passed to the cMRS 14 by the merchant server 20 upon loading the plug-in 14 into the consumer's browser.

The security and encryption used by the cMRS 14 includes 40 bit SSL connections for any confidential information exchanges between the cMRS 14 and tMRS 32/mMRS 22 and the cMRS 14 uses the DES when working with any card or PIN information run through the PIN/PAD 16.

The consumer is provided access to help and information when performing on-line transactions that come directly from a customer's checking account. It will be natural for a consumer to have concerns and questions. Throughout, the entire authorization process, the cMRS 14 displays links to detailed information about each step. These links will summarize the security of the transactions, and provide the consumer with ways to get more detailed information if desired.

The present invention can also be explained by reference to the following series of screen shots which show an example of what a consumer will experience when using the MRS. In this example, the merchant is a fictitious business called Merchant E-Books.

Figure 5:
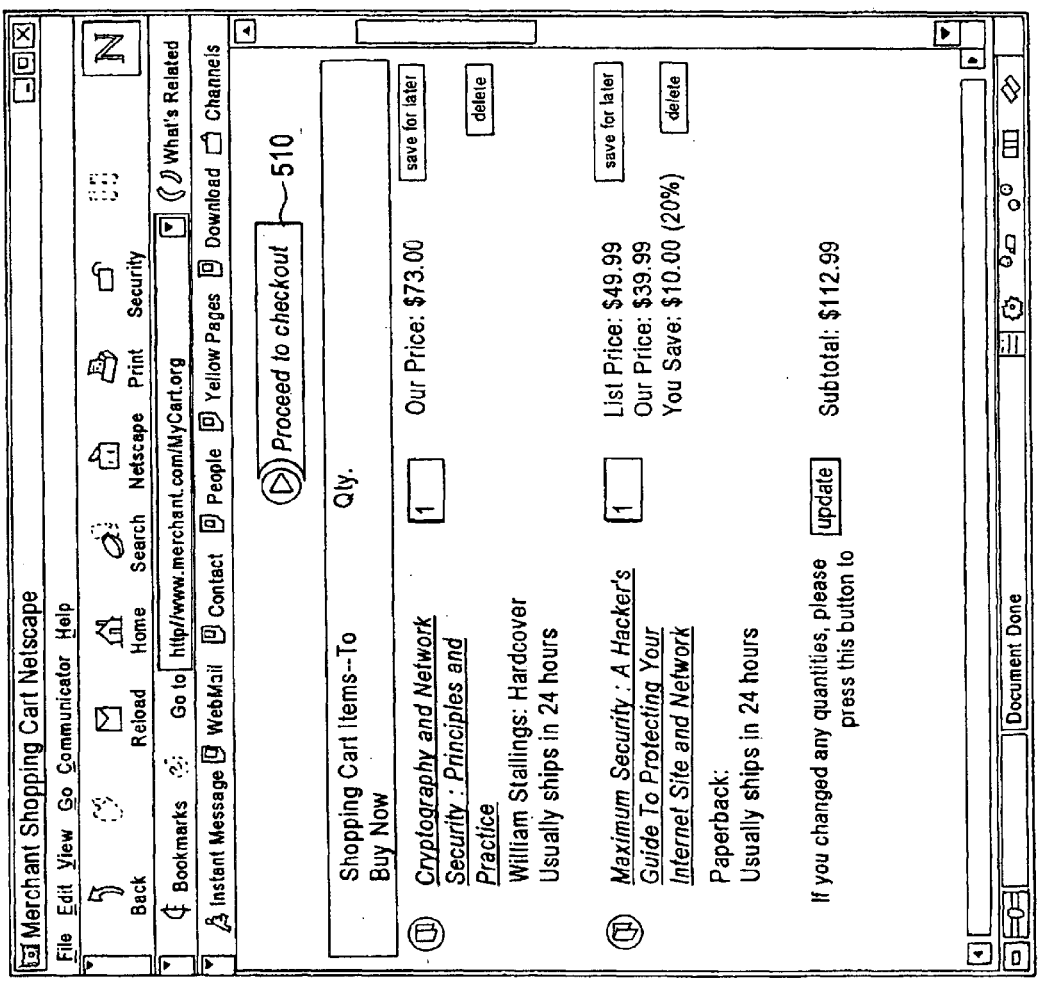
FIG. 5 is a screen shot depicting contents of a shopping cart on the merchant web site.

In FIG. 5, a consumer might see that they are viewing the contents of their shopping cart using computer 12 on the merchant web site 20. Merchant shopping cart systems will of course vary drastically from merchant to merchant. The consumer would be able to click on a check out button 510 "proceed to checkout" to initiate their financial transaction as depicted in FIG. 5.

Following checkout, the consumer would typically be directed to a secure web page depicted in FIG. 6 in order to begin filling in the information that the merchant requires to fill the order. In the example depicted in FIG. 6, the secure page is indicated both by the S in https, and by the locked padlock in the lower left hand corner of the browser window.

Upon completion of the merchant required information, there would be a final button 610 on the merchant web site directing the consumer to the secure authorization page. The consumer should be made aware of the requirements involved when choosing MRS as their transaction method. For example, "Pin/Pad required".

Figure 7:
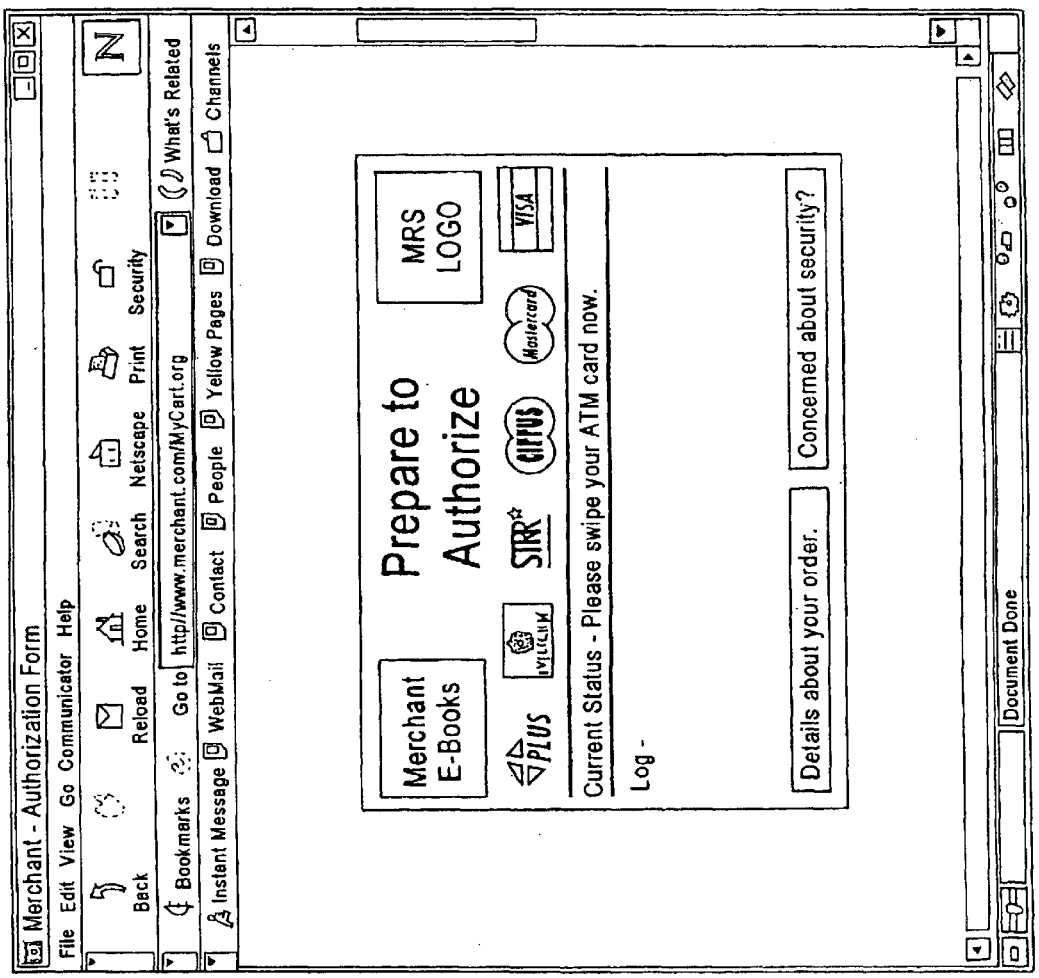
FIG. 7 is an exemplary screen shot of the consumer merchant response software display.

As depicted in FIG. 7, after performing its initial requirement checks, the cMRS 14 plug-in will display its opening screen to the consumer. The status of the plug-in at this point will simply be that it is waiting for a card to be swiped using PIN/PAD 16 due to security restrictions involved in allowing plug-ins to activate devices such as the PIN/PAD 16, the consumer may receive a confirmation message, asking if it is okay to give cMRS 14 this kind of access. The consumer must be asked if he is using his credit card or ATM/debit card. No pin is required for credit cards.

Figure 8:
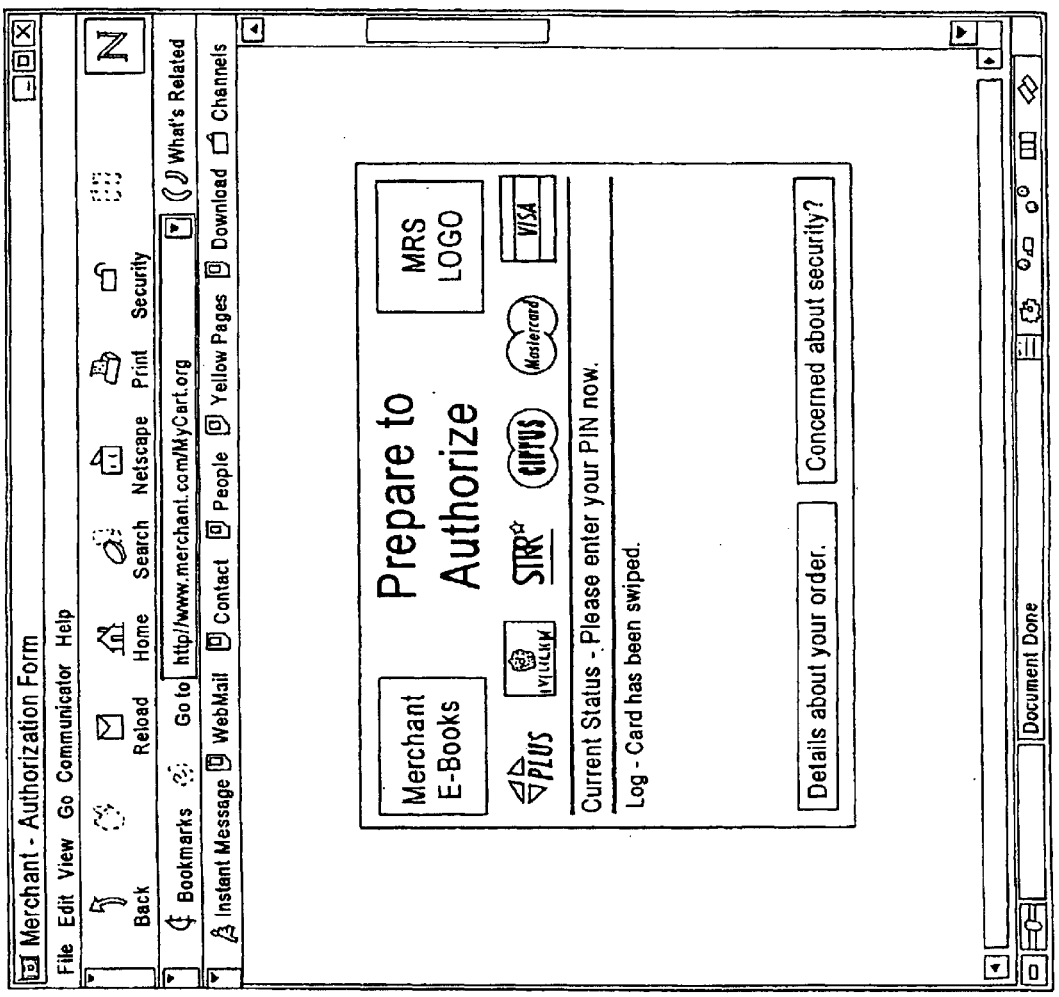
FIG. 8 is a screen shot depicting a prompt screen for entering a PIN number.

As depicted in FIG. 8, the consumer will be prompted to enter their PIN number into the PIN/PAD device 16. Notice that there is now an entry next to the log indicating that the consumer" card has been swiped. No pin is required for credit cards.

Figure 9:
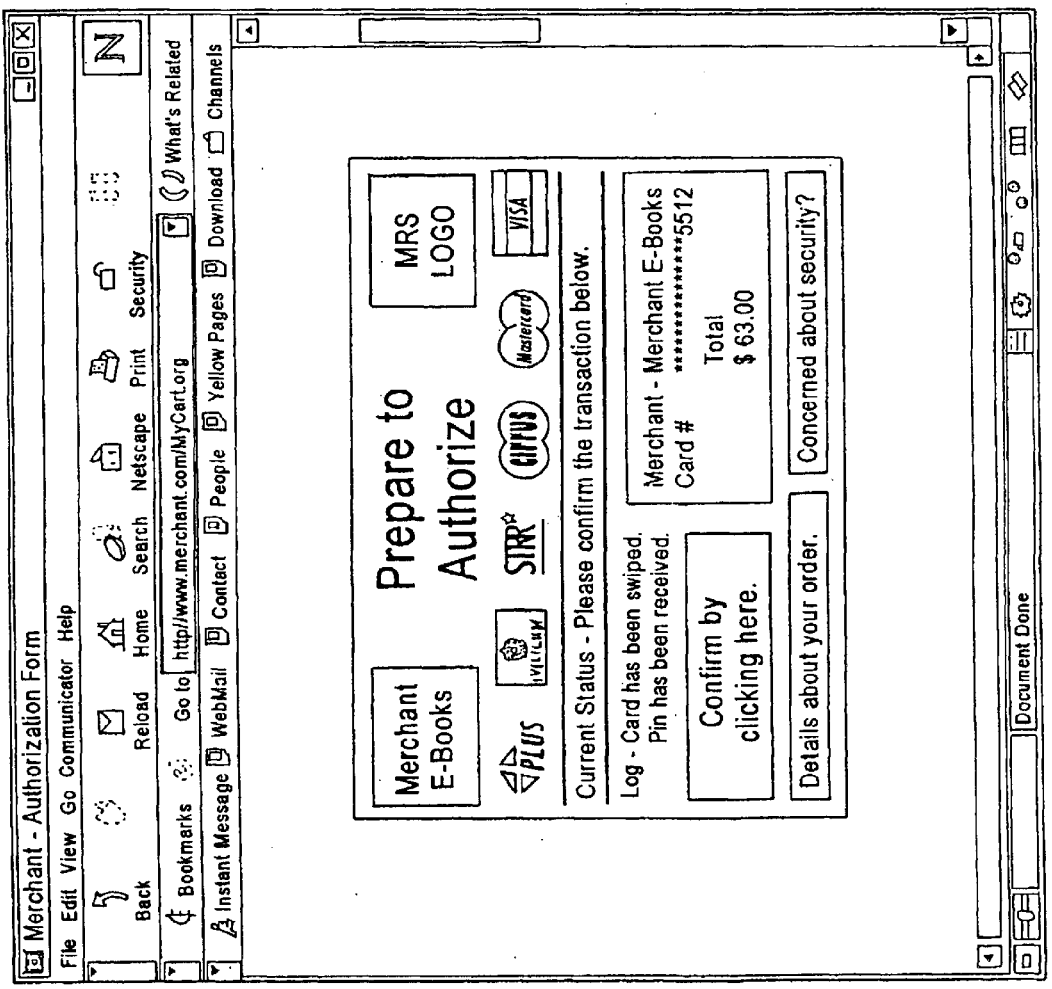
FIG. 9 is a screen shot depicting consumer confirmation of the transaction before beginning the transaction.

As depicted in FIG. 9, the consumer confirmation of transaction is performed before beginning the transaction.

Figure 10:
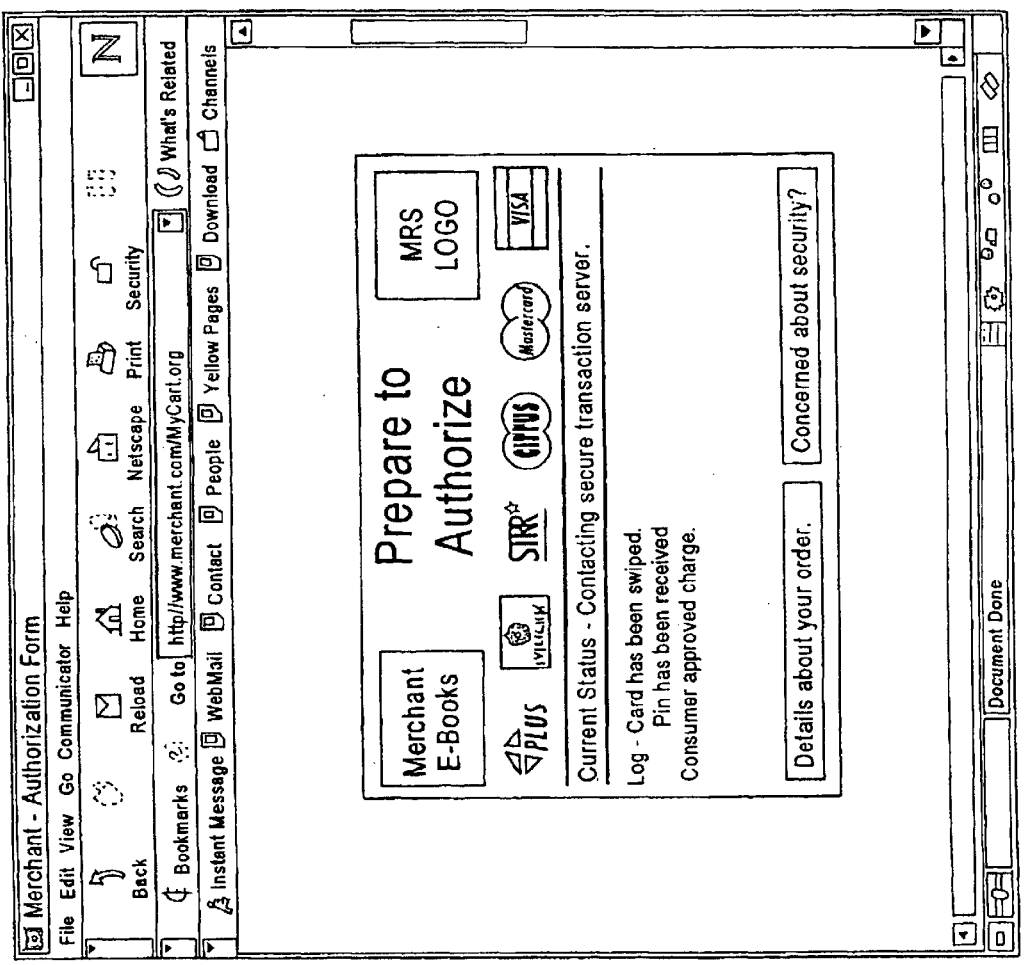
FIG. 10 is a screen shot depicting the initial connection between the consumer merchant response software and the secure server transaction server.

As depicted in FIG. 10, once the consumer has entered and confirmed the transaction, the cMRS 14 makes its initial connection to the tMRS 32 program running on the STMS 32 system.

Figure 11:
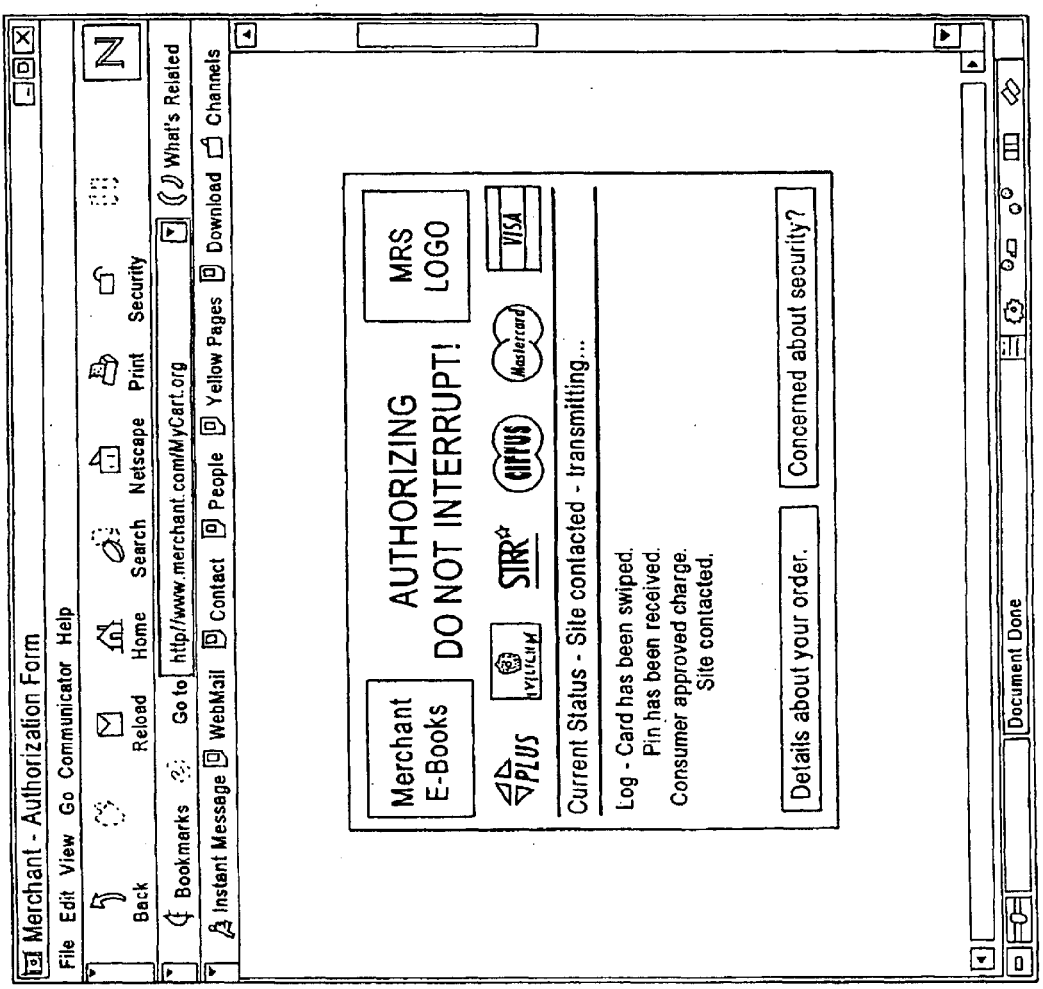

As depicted in FIG. 11, now that STMS 32 has been contacted and the transaction set in motion, a large message is displayed indicating to the consumer they should not be interrupted. Upon contacting the site, the cMRS 14 updates its status and begins transmitting the transaction request.

Figure 12:
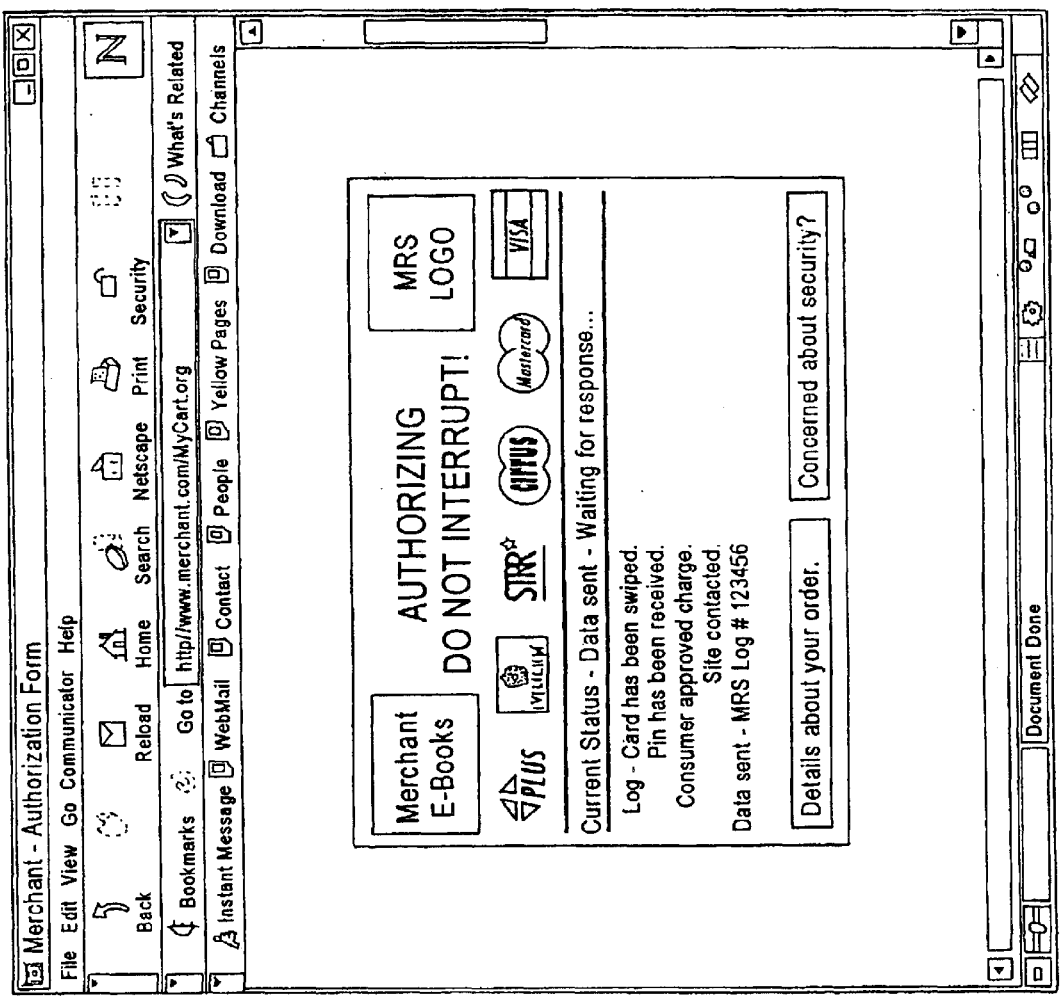
FIG. 12 is a screen shot depicting an entry in the log depicting the transaction number.

As depicted in FIG. 12, after transmitting the request, there is a new entry in the log indicating a tMRS 32-transaction number. This number can be used by the consumer to obtain information in the event of a problem. This number can also be used by the cMRS 14 to automatically check the status in the event of an Internet communication failure.

Figure 13:
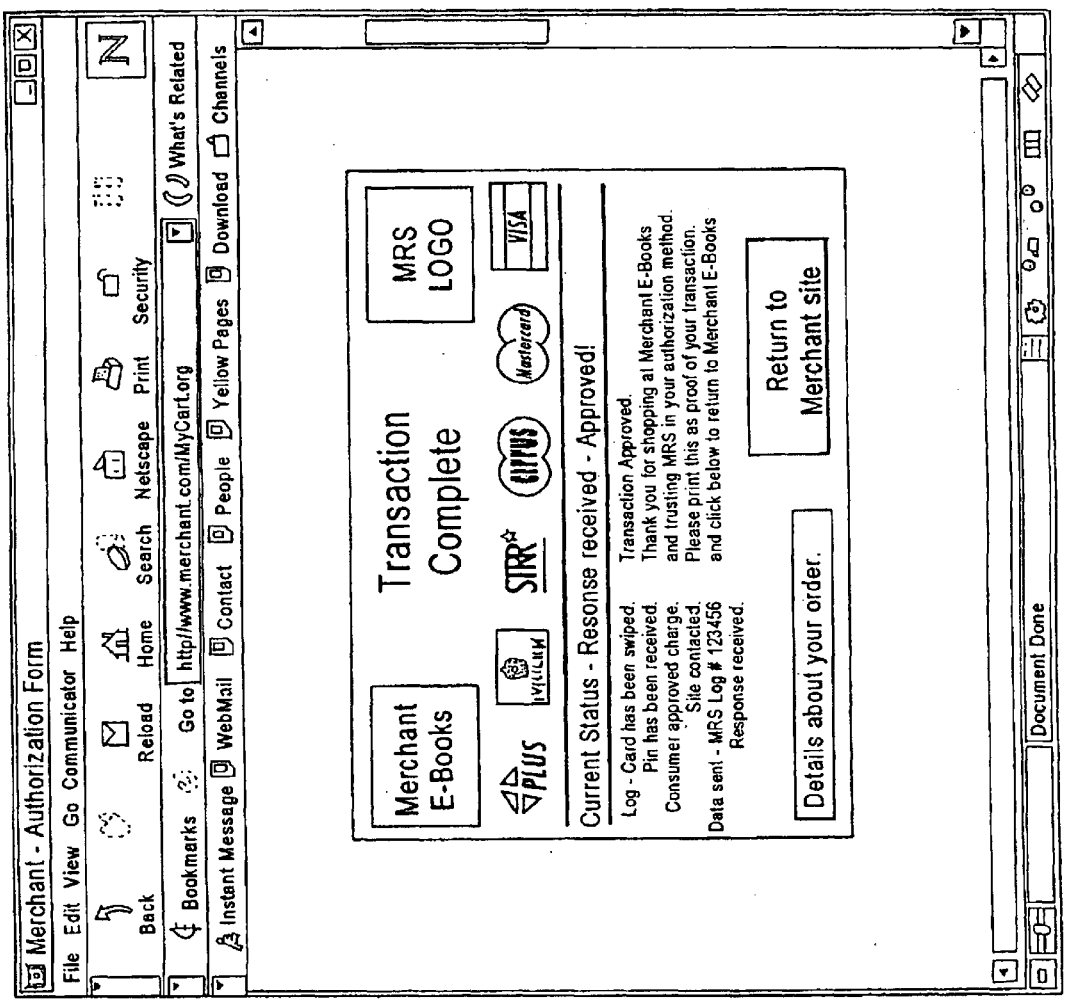
FIG. 13 is a screen shot asking the consumer to print the screen and maintain a copy for their records.

As depicted in FIG. 13, upon final completion, the consumer is asked to print the current screen and maintain a copy for their records. More detail for printing can be obtained by clicking on the "details about your order button".

The Specifications and Requirements of the STMS Portion 30, 32

The transaction database 36 that resides on the STMS will contain detailed information about the valid merchants who may use tMRS 32 for transactions. Some of this information is listed below. The fields, tables and indices in this database can be expanded.

Company name

Merchant number

Street address, city, state, zip code, country

Financial contact name, number(s), address

Technical contact name, number(s), address

Web site address

Special URL for mMRS access. Default is https://Company.com/MRS/mMRS

Status—current, pending, revoked, etc.

Special notes and circumstances

SIC code

The transaction database will contain detailed entries of all transaction requests from beginning to end. Some of this information is listed below. Information that is required in order to initiate a transaction from the cMRS it is indicated by an asterisk (*)

Transaction number assigned by tMRS

* Merchant number
* Merchant tracking number assigned by merchant shopping cart system
* Total dollar amount of the transaction
* Consumer last name
* Consumer first name
* Consumer phone number, in case of problems
* Consumer card number, possibly DES encrypted for added security Status—new, pending, success, fail, invalid Notes—error messages and/or logs by a MRS operator Time of initial entry and/or update of status field

* E-mail address of consumer

Card type

Authcode

Reference#

Pin Pad ID

Path

The following additional entries are recommended for the sole purpose of tracking down possible hack attempts against the STMS system. This type of information is typically tracked and monitored by the firewall as well. Quality firewall software is configured to automatically block addresses when a possible hack is detected.

TCP/IP address of requesting system

Web browser type and version

Ethernet/MAC address from dedicated connections if available.

The Specifications and Requirements of the mMRS 22 That Runs on the Merchant's Web Server 20

Just as the tMRSdb 36 can be used to track detailed information on transactions, the mMRSdb can be used by merchants to track detailed information bout the transactions that are processed. Because merchants may have returning customers, the mMRS database will have a separate table to track consumer information. All fields listed below, are required fields and other fields can be added.

mMRS_ConsumerTable [Object Type mMRSConsumer]

Consumer ID

Consumer full name

Consumer e-mail 1 & 2

Phone 1 and 2, and fax #

Billing address

Delivery address

Comments mMRS_TransactionLogTable [Object Type mMRSLogEntry]

Unique Key—Merchant Transaction Number

Unique Key—tMRS Transaction Number, undefined to begin with

Consumer ID

Status of Transaction

Dollar Amount

Comments about the transaction or status codes

Date/Time of Initiation

Date/Time of last status update.

Specific products or services ordered by the consumer should be kept in a separate database or log file system developed by the merchants independently.

LIB/DLL Functions

Some functions of the mMRS product will be written as shared callable routines. This will allow merchant web masters to easily call the routines from standard web scripts supported by Unix and Windows based servers. These functions are summarized below.

mMRS_CreateConsumer(NL):

This [bool] function shall create an entry in the mMRS_ConsumerTable. All fields listed above are required fields in order to create an entry in the database. This function can be called when a new consumer initiates a transaction with a merchant. This function is bypassed for returning consumers.

Object type for This Bool Function:

mMRSConsumer mMRS_CreateLogEntry(NL):

Prior to loading the cMRS plug-in into a consumer's web browser, the merchant must create an entry in the transaction log so that it can be updated by tMRS upon completion of the transaction. This is how merchants will be able to track the status of transactions. All fields listed above are required for this function.

Object Type for This Bool Function:

mMRSLogEntry

MMRS_QueryLog(varchar TransactionNumber[ ]):

This function will allow the merchant to get the status of a transaction from within a web page, or from any custom application developed by the merchant. The mMRSLogEntry object shall be defined to return all possible values from the database.

Object Type for This Bool Function:

mMRSLogEntry mMRS_QueryConsumer(varchar ConsumerID[ ]):

This function will allow the merchant to get pertinent information on a consumer based on the Consumer ID passed to the function.

Object Type for This Bool Function:

nMRSConsumer mMRS_UpdateLog( )L

Merchants should be able to update their transaction logs if the need arises. For the most part, tMRS 32 will be performing the status updates via an SSL connection to another mMRS 22 utility described below.

Object Type for This Bool Function:

mMRSLogEntry

CGI (Common Gateway Interface) Functions

In order for tMRS 32 to update and request status from the merchant's transaction log, some CGI functions will be required. These functions shall only be accessible via an SSL connection, and are summarized below. Because these are CGI-Scripts, there are no objects defined for them. Parameters must be passed from the posting cMRS 14 or tMRS 32 functions.

mMRS_Query:

Hardware Overview

Figure 14:
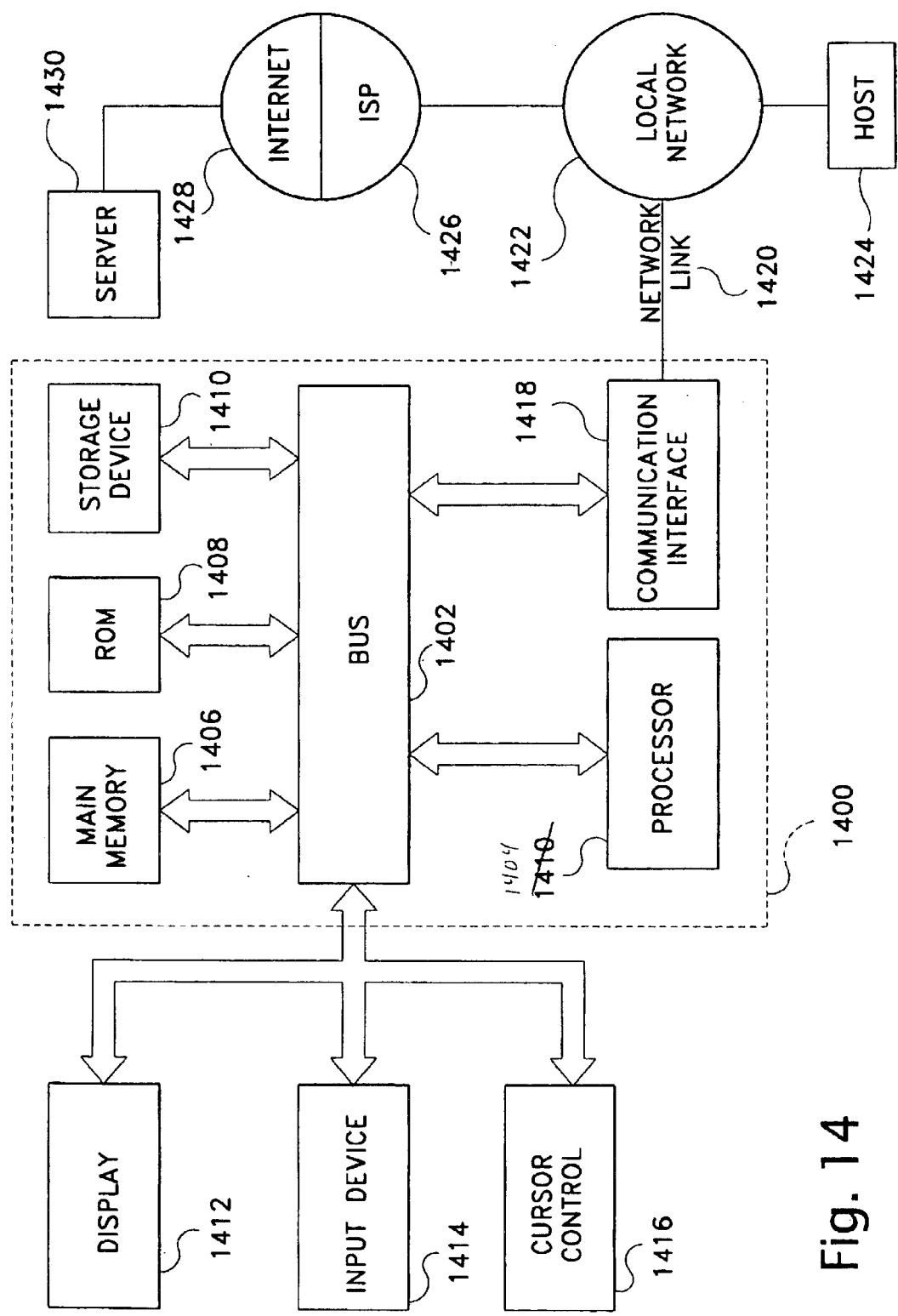
FIG. 14 is a high level block diagram of a computer system usable with the present invention.

FIG. 14 is a block diagram illustrating an exemplary computer system 1400 upon which an embodiment of the invention may be implemented. The computer system 1400 can be used, for example. The present invention is usable with currently available personal computers, mini-mainframes and the like.

Computer system 1400 includes a bus 1402 or other communication mechanism for communicating information, and a processor 1404 coupled with the bus 1402 for processing information. Computer system 1400 also includes a main memory 1406, such as a random access memory (RAM) or other dynamic storage device, coupled to the bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to the bus 1402 for storing static information and instructions for the processor 1404. A storage device 1410, such as a magnetic disk or optical disk, is provided and coupled to the bus 1402 for storing information and instructions.

Computer system 1400 may be coupled via the bus 1402 to a display 1412, such as a cathode ray tube (CRT) or a flat panel display, for displaying information to a computer user. An input device 1414, including alphanumeric and other keys, is coupled to the bus 1402 for communicating information and command selections to the processor 1404. Another type of user input device is cursor control 1416, such as a mouse, a trackball, or cursor direction keys for communicating direction information and command selections to processor 1404 and for controlling cursor movement on the display 1412. This input device typically has two degrees of freedom in two axes, a first axis (e.g., x) and a second axis (e.g.,) allowing the device to specify positions in a plane.

The invention is related to the use of a computer system 1400, such as the illustrated system, to display and process secure Internet payment transactions. According to one embodiment of the invention, the processing of secure Internet payment transactions is provided by computer system 1400 in response to processor 1404 executing sequences of instructions contained in main memory 1406. Such instructions may be read into main memory 1406 from another computer-readable medium, such as storage device 1410. However, the computer-readable medium is not limited to devices such as storage device 1410. For example, the computer-readable medium may include a floppy disk, a flexible disk, hard disk, magnetic tape, or any other magnetic medium, a CD-ROM, any other optical medium; punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 1406 causes the processor 1404 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 1400 also includes a communication interface 1418 coupled to the bus 1402. Communication interface 1418 provides a two-way data communication as is known. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals which carry digital data streams representing various types of information. Of particular note, the communications through interface 1418 may permit transmission or receipt of the secure Internet payment transactions. For example, two or more computer systems 1400 may be networked together in a conventional manner with each using the communication interface.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication services through the world wide packet data communication network now commonly referred to as the "Internet" 1428. Local network 1422 and Internet 1428 both use electrical, electromagnetic or optical signals which carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418. In accordance with the invention, one such downloaded application provides for information discovery and visualization as described herein.

The received code may be executed by processor 1404 as it is received, and/or stored in storage device 1410, or other non-volatile storage for later execution. In this manner, computer system 1400 may obtain application code in the form of a carrier wave.

It should now be apparent that a method and system for providing secure Internet payments using either a credit card or ATM card has been described.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of transacting a secure purchase via the Internet, comprising:
    browsing a merchant web site by a user;
    selecting an item to purchase on the merchant web site;
    sending, from the merchant web site to a user computer, information with an embedded application which communicates with a PIN/PAD and instructs the user as needed using a dynamic HTML page;
    creating an encrypted PIN block using a unique session key;
    building an order from the merchant web site including purchase information and the encrypted PIN block to form a data block and further encrypting the data block to form an encrypted payment block;
    forwarding the encrypted payment block directly to a secure host over the Internet;
    decrypting the encrypted payment block by the secure host;
    routing a decrypted payment block formatted for use by a bank system;
    proceeding with the order if the secure host receives from the bank system a bank authorization for the purchase, and if no authorization is received, then canceling the purchase;
    forwarding the authorization to the merchant web site over the Internet; and
    sending an indication of a completion of the purchase to the user over the Internet,
    wherein the dynamic HTML page is a JAVA script with hidden fields.

2. The method of claim 1, wherein the encrypted PIN block is encrypted to a DES standard.

3. The method of claim 1, wherein the further encryption is a public/private key encryption.

4. The method of claim 1, wherein said forwarding step forwards the encrypted payment block over the Internet.

5. The method of claim 1, wherein said creating step is performed using a PIN/PAD.

6. The method of claim 1, wherein the decrypted payment block is encrypted into a DES encrypted block.

7. The method of claim 6, comprising reformatting for transmission the DES encrypted payment block to the bank system.

8. The method of claim 7, comprising decrypting the DES encrypted payment block at the bank system.

9. The method of claim 1, comprising instructing a PIN/PAD to deliver the encrypted PIN block and routing the PIN block to the secure host.

10. The method of claim 1, comprising providing a working key to the PIN/PAD.

11. The method of claim 1, wherein the method meets current network ATM network standards.

12. A system for transacting a secure purchase via the Internet, comprising:
    a consumer Internet access device having a merchant response software plug-in loaded into a web browser residing thereon for building an order using a dynamic HTML page;

a PIN/PAD operatively connected to said consumer Internet access device for entering a consumer PIN and for including a unique session key;

a merchant server having a merchant response software residing thereon for recording information about consumer transactions with the merchant server; and a secure transaction management server which receives the PIN directly from the consumer Internet access device having a merchant response software residing thereon for forwarding the PIN to a bank system and sending an authorization from the bank system to the merchant server and the consumer Internet access drive, wherein the dynamic HTML page is a JAVA script with hidden fields.

13. The system of claim 12, comprising entering a personal identification number (PIN) on a PIN/PAD.

14. The system of claim 12, wherein the PIN block is encrypted using data encryption standard (DES) encryption.

15. The system of claim 12, wherein the consumer identification device is a PIN/PAD.

16. The system of claim 12, wherein the method meets current network ATM network standards.

17. A method of transacting a secure purchase via the Internet, comprising:

browsing a merchant web site by a user;

selecting an item to purchase on the merchant web site;

sending, from the merchant web site to a user computer, information with an embedded application which communicates with a PIN/PAD and instructs the user as needed using a dynamic HTML page;

entering a consumer identification using an identification device;

building an order from the merchant web site including purchase information and the consumer identification to form a data block using a unique session key and further encrypting the data block to form an encrypted payment block;

forwarding the encrypted payment bock directly to a secure host over the Internet;

decrypting the encrypted payment block by the secure host;

routing a decrypted payment block formatted for use by a bank system;

proceeding with the order if the secure host receives from the bank system a bank authorization for the purchase, and if no authorization is received, then canceling the purchase;

forwarding the authorization to the merchant web site; and sending an indication of a completion of the purchase to the user, wherein the dynamic HTML page is a JAVA script with hidden fields.

18. The method of claim 17, wherein the consumer identification device is a PIN/PAD.

19. The method of claim 18, wherein consumer identification is encoded into an encrypted PIN block which is encrypted to a DES standard.

20. The method of claim 19, herein the further encryption is a public/private key encryption.

21. The method of claim 19, wherein the decrypted is encrypted into a DES encrypted block.

22. The method of claim 21, comprising reformatting for transmission the DES encrypted payment block to the bank system.

23. The method of claim 22, comprising decrypting the DES encrypted payment block at the bank system.

24. The method of claim 17, wherein said forwarding step forwards an encrypted payment block over the Internet.

25. The method of claim 17, wherein said entering step is performed using a PIN/PAD.

26. The method of claim 17, comprising instructing a PIN/PAD to deliver the encrypted PIN block and routing the PIN block to the secure host.

27. The method of claim 17, wherein the embedded application is a JAVA script.

28. The method of claim 17, comprising providing a working key to the PIN/PAD.

29. A system for transacting a secure purchase via the Internet, comprising:

a consumer Internet access device having a merchant response software plug-in loaded into a web browser residing thereon for building an order using a dynamic HTML page;

a consumer identification device operatively connected to said consumer Internet access device for entering a consumer identification and for including a unique session key;

a merchant server having a merchant response software residing thereon for recording information about consumer transactions with the merchant server which the merchant server receives directly from the consumer Internet access device; and a secure transaction management server having a merchant response software residing thereof for forwarding the consumer identification to a bank system and sending an authorization from the bank system to the merchant server and the consumer Internet access drive, wherein the dynamic HTML page is a JAVA script with hidden fields.

* * * * *